A. VAN RENSSELAER & F. H. TENNEY.
ELAPSE TIME COMPUTER AND CENTURY CALENDAR MACHINE.
APPLICATION FILED NOV. 7, 1911.

1,041,204.

Patented Oct. 15, 1912.

A. VAN RENSSELAER & F. H. TENNEY.
ELAPSE TIME COMPUTER AND CENTURY CALENDAR MACHINE.
APPLICATION FILED NOV. 7, 1911.

1,041,204.

Patented Oct. 15, 1912.

A. VAN RENSSELAER & F. H. TENNEY.
ELAPSE TIME COMPUTER AND CENTURY CALENDAR MACHINE.
APPLICATION FILED NOV. 7, 1911.

1,041,204.

Patented Oct. 15, 1912.

WITNESSES:
Ripley
W. R. Sampson

INVENTORS
Allen Van Rensselaer
Fred H. Tenney
BY Donald Heil
ATTORNEY

A. VAN RENSSELAER & F. H. TENNEY.
ELAPSE TIME COMPUTER AND CENTURY CALENDAR MACHINE.
APPLICATION FILED NOV. 7, 1911.

1,041,204.

Patented Oct. 15, 1912.

27 28 29 30 31 JAN. | 27 28 29 FEB. | 30 31 MCH. | 30 APR. | 31 MAY | JUNE | JULY | AUG.

WITNESSES:

INVENTORS
Allen Van Rensselaer
Fred H. Tenney
BY
Leonard Keil
ATTORNEY

A. VAN RENSSELAER & F. H. TENNEY.
ELAPSE TIME COMPUTER AND CENTURY CALENDAR MACHINE.
APPLICATION FILED NOV. 7, 1911.

1,041,204.

Patented Oct. 15, 1912.

A. VAN RENSSELAER & F. H. TENNEY.
ELAPSE TIME COMPUTER AND CENTURY CALENDAR MACHINE.
APPLICATION FILED NOV. 7, 1911.

1,041,204.   Patented Oct. 15, 1912.
11 SHEETS—SHEET 7.

FIG. 6.

A. VAN RENSSELAER & F. H. TENNEY.
ELAPSE TIME COMPUTER AND CENTURY CALENDAR MACHINE.
APPLICATION FILED NOV. 7, 1911.

1,041,204.

Patented Oct. 15, 1912.
11 SHEETS—SHEET 8.

FIG. 6.

A. VAN RENSSELAER & F. H. TENNEY.
ELAPSE TIME COMPUTER AND CENTURY CALENDAR MACHINE.
APPLICATION FILED NOV. 7, 1911.

1,041,204.

Patented Oct. 15, 1912.
11 SHEETS—SHEET 9.

FIG. 6.

A. VAN RENSSELAER & F. H. TENNEY.
ELAPSE TIME COMPUTER AND CENTURY CALENDAR MACHINE.
APPLICATION FILED NOV. 7, 1911.

1,041,204.

Patented Oct. 15, 1912
11 SHEETS—SHEET 11.

*FIG. 6*

WITNESSES:

INVENTORS
Allen Van Rensselaer
Fred H. Tenney
BY
ATTORNEY

UNITED STATES PATENT OFFICE.

ALLEN VAN RENSSELAER AND FRED H. TENNEY, OF SPOKANE, WASHINGTON.

ELAPSE-TIME COMPUTER AND CENTURY-CALENDAR MACHINE.

1,041,204.   Specification of Letters Patent.   Patented Oct. 15, 1912.

Application filed November 7, 1911. Serial No. 659,031.

*To all whom it may concern:*

Be it known that we, ALLEN VAN RENS­SELAER and FRED H. TENNEY, citizens of the United States, residing at 1920 West River­side avenue and 1507 West Fourth avenue, respectively, in the city of Spokane, in the county of Spokane and State of Washing­ton, have invented a new and useful Elapse-Time Computer and Century-Calendar Ma­chine, of which the following is a specifica­tion.

Our invention consists in the novel ar­rangement of a calendar upon one chart and a calendar and numbers of elapsed days upon another chart, and the arrangement and construction of these two charts in re­lation to each other; and the objects of our invention are, first, to determine expedi­tiously the number of days, not exceeding three hundred and sixty-five (365), that will elapse between two given dates; second, to determine expeditiously the date on which the last day of a given number of days, not exceeding three hundred and sixty-five, calculated from a given date, will fall; third, to obtain a calendar for any year in the twentieth century. We attain these objects by the mechanisms illustrated in the accompanying drawings, in which similar characters of reference indicate similar divisions and sub-divisions of parts.

Fig. 5 is one of the two charts and shall be referred to in the detailed descrip­tion as chart L. This figure is drawn on Sheets 2 to 5 inclusive, which sheets must be joined as follows to make the entire fig­ure: *b f* of Sheet 2 to *b f* of Sheet 3, *c g* of Sheet 3 to *c g* of Sheet 4, and *f g* of Sheet 3 to *f g* of Sheet 5; Fig. 6 is the other of the two charts and shall be referred to in the detailed description as chart N. This figure is drawn on Sheets 6 to 11 inclusive, which sheets must be joined as follows to make the entire figure: *n r* of Sheet 6 to *n r* of Sheet 7, *o s* of Sheet 7 to *o s* of Sheet 8, *q r* of Sheet 6 to *q r* of Sheet 9, *r s* of Sheet 7 to *r s* of Sheet 10, and *s t* of Sheet 8 to *s t* of Sheet 11.

Figure 4:
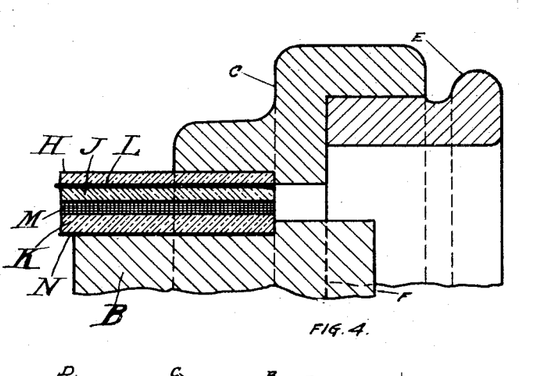
Fig. 4 is a part section through end of Fig. 1, and is drawn to the same scale as Fig. 3.
Figure 5:
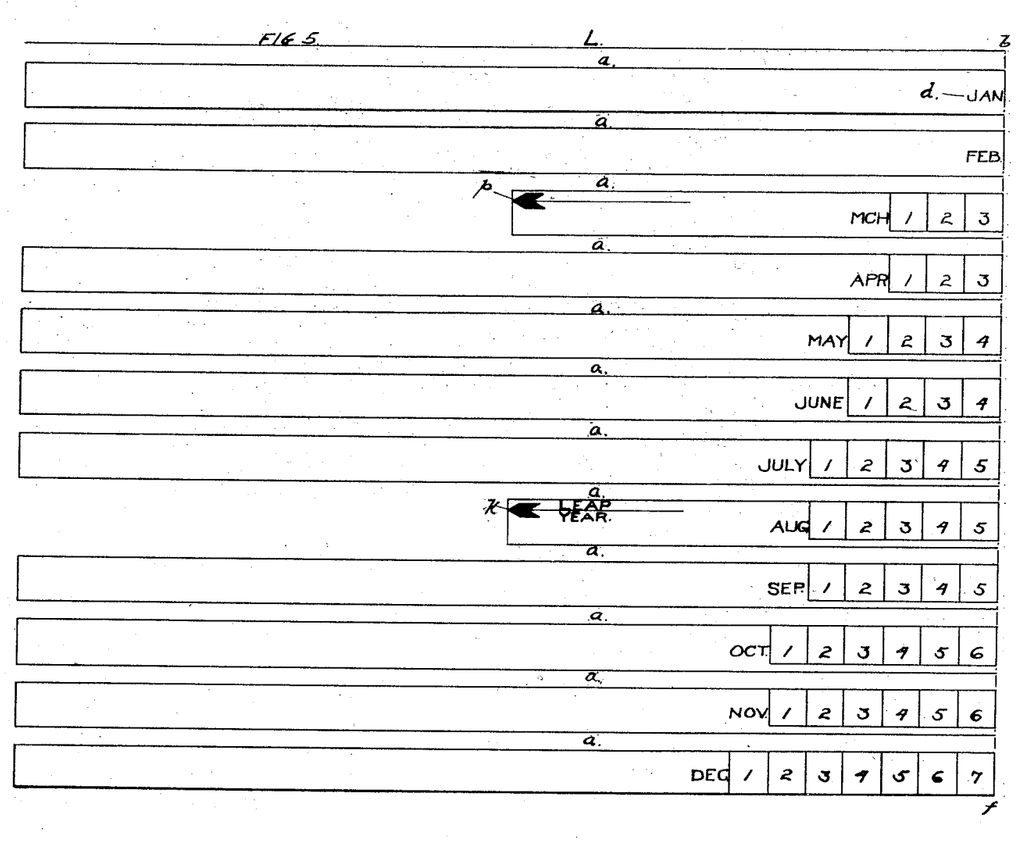
Figure 6:
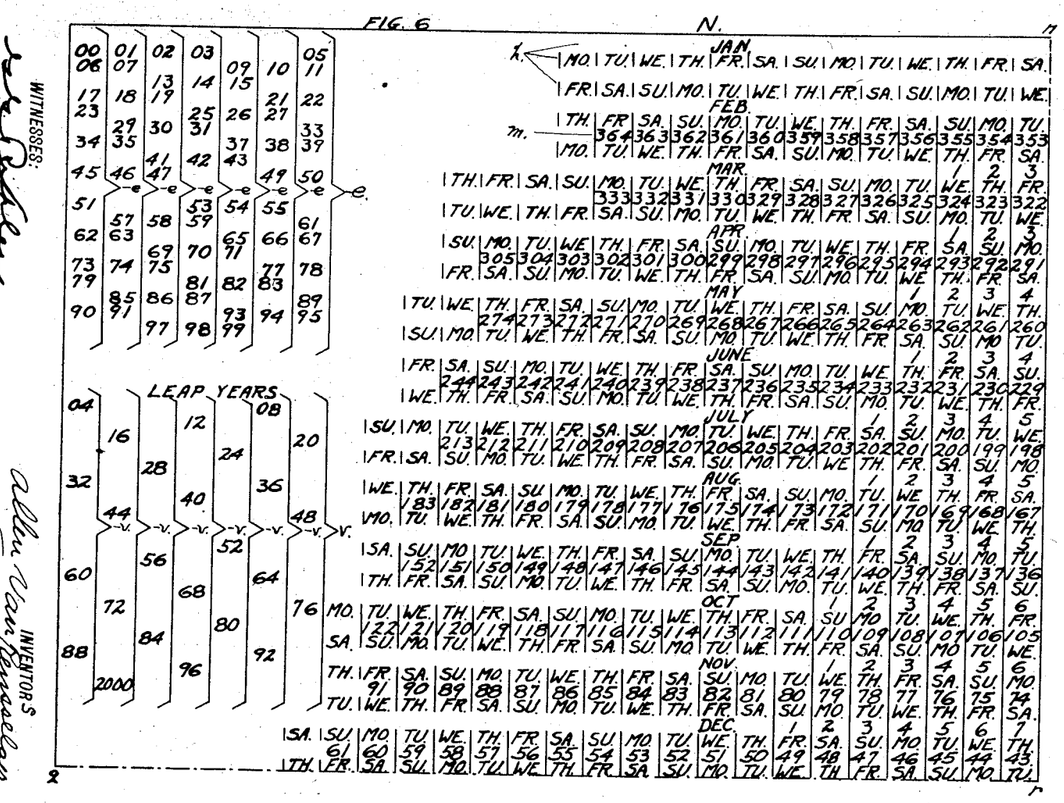

Chart L and chart N, Fig. 4, are the es­sential parts of this machine. Chart L con­sists, first, of calendar *d*, which is a calendar of all the months and days of the months in a year, so arranged that the number of days from any date in any month to the date appearing directly thereunder in the succeeding month, is in every instance thirty-one (31); second, of slots *a* through which, when the machine is made up as hereinafter described, can be read chart N; third, of common year indicating arrow *p* and leap year indicating arrow *k*; fourth, of elapsed-time opening *x*.

Chart N consists of, first, calendar *h*, on which the months and days of the months in a year are arranged in the same manner as on calendar *d*, chart L; on calendar *h* occur and reoccur the days of the week, also; second, elapsed-days numbers *m*, which is a chart within itself made up of repetitions of numbers from 1 to 365 inclusive, which numbers are arranged in twenty-three rows in such relation to each other that the dif­ference between any number in any row and the number in the row directly over it, is in every instance thirty-one (31); 365 must be added to numbers from 1 to 30 in row *z* and from 1 to 31 in row *y*, in each instance, to make this general scheme hold good as to rows *y* and *z* and the row directly under each of them; the numbers in elapsed-days numbers *m*, it will be observed, occur in many instances within the same confine of space as calendar *h*: third, brackets *e* which brackets embrace the common years in the twentieth century: fourth, brackets *v* which brackets embrace the leap years in the twen­tieth century.

Figure 1:
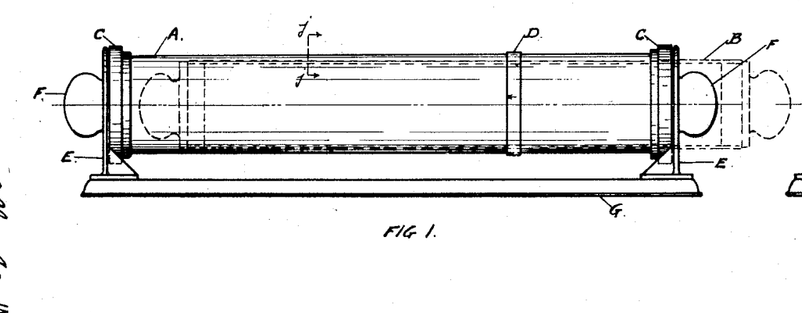
Figure 1 is a side elevation of the entire machine in which no part of the two charts, herein before mentioned and hereinafter de­scribed, is visible, but will be on the ma­chine itself, because of the difficulty and impossibility of practically executing a drawing, making any portion of these charts visible.
Figure 2:
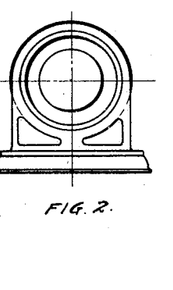
Fig. 2 is an end elevation of the entire machine.
Figure 3:
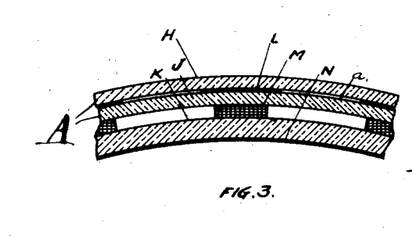
Fig. 3 is a part vertical cross-section taken on line *j j* of Fig. 1, the scale of which is to the scale of Fig. 1 as 12 is to 1.

Referring specifically to Figs. 1, 3 and 4 of the accompanying drawings, the base G and the supports E, constitute the frame work of the machine. The principal parts of the device are, first, combination cylinder A, Fig. 3, which is composed of two trans­parent cylinders, H and J, Fig. 4, and chart L, above described, between them, all snugly fitted together and securely fastened to­gether with cement and rings C, so as to operate as a unit. Rings C revolve on brackets E with a sliding fit; second, combination cylinder B, Fig. 4, which is composed of transparent cylinder K, Fig. 4, and chart N, above described, which chart is firmly fastened to the inside of said transparent cylinder K. Combination cylinder B operates inside combination cylinder A. Felt strips M, Fig. 4, which are about .004 of an inch in thickness, are pasted on the inside of combination cylinder A, in such a manner as not to obstruct the vision to chart N through slots $a$ in chart L. Felt strips M form a cushion so that combination cylinder B can be rotated in, and slid in and out of combination cylinder A, with a free and easy motion, by means of wooden knobs F firmly fastened to the ends of combination cylinder B. Indicator D is a narrow band extending from one-half to two-thirds of the distance around the outside of combination cylinder A, with an indicating point at one end, the band being made of elastic material so that it clasps firmly to combination cylinder A by virtue of its elasticity, and can be slid laterally and cylindrically so that the indicating point can be placed at any point on the surface of combination cylinder A. Transparent cylinders H, J and K will be made of material of such quality and degree of transparency that chart N can be read readily through the three. Charts L and N are placed in the proper relation to each other to accomplish the objects above set forth.

The method of operating this machine to attain the objects above set forth, is as follows: To determine the number of days that will elapse between two given dates, place indicator D, Fig. 1, on the later of the two given dates, on calendar $d$, chart L, then rotate and slide combination cylinder B until the earlier of the two given dates appears on calendar $h$, chart N, in slot $a$ directly over the date on which indicator D has been set; the number of elapsed days can then be read on elapsed-days numbers $m$, chart N, in elapsed-time opening $x$. If February 29 intervenes between the two given dates, add one to the result thus obtained. The moving parts may be revolved as a unit to a position where elapsed-time opening $x$ will be visible to the operator, without disturbing the setting. To determine on what date the last day of a given number of days, calculated from a given date, will fall, rotate combination cylinder B in its normal position until the month containing the given date appears in slot $a$, on calendar $h$, chart N, over the month on calendar $d$, chart L, in which the last day will fall; the month in which the last day will fall can be, and must be calculated mentally; with the cylinders in this position, a number will be read on elapsed-days numbers $m$ in elapsed-time opening $x$, which will be near the given number. If this number is smaller than the given number, slide combination cylinder B directly to the right; if greater, to the left, until the given number does appear in elapsed time opening $x$. With the given number of days in elapsed-time opening $x$, the date on which the last day of the given number of days, will fall, will be found on calendar $d$, chart L, directly under the given date from which the calculation is made. If February 29 intervenes, the last day will fall a day earlier than the date thus obtained. To obtain the calendar for any year in the twentieth century, if the year is a common year, place the point of common year indicating arrow $p$, chart L, to the point of bracket $e$, chart N, embracing the year for which the calendar is sought. When thus set, the two charts will form the calendar, the days of the weeks appearing on calendar $h$, chart N, in slots $a$ over the dates on calendar $d$, chart L. If the year for which the calendar is sought, is a leap year, place the point of leap year indicating arrow $k$ to the point of bracket $v$ embracing the year for which the calendar is sought.

Having thus fully described our machine, what we claim as new and desire to secure by Letters Patent is:—

1. In an elapse time computer and century calendar machine, the combination of an outer chart and an inner chart, with an arrangement on the outer chart of a calendar of the months and the dates of the months in regular order, in twelve horizontal, parallel rows with slots between the rows, and with a calendar of the months and dates of the months on the inner chart arranged in the same manner as the one on the outer chart except that there are no slots between the rows, and with an arrangement of numbers, called herein elapsed-days numbers, on the inner chart, ranging from 1 to 365 inclusive, in such order and in such relation to each other and in such relation and position to the calendar on the inner and outer charts and with the two calendars in such relation and position to each other, in short, the whole arrangement of the dates of the calendars and the elapsed-days numbers being in such manner that when two dates are selected, with not to exceed 365 days between them, and the inner chart is slid or slid and rotated, or placed by any means, in such a position to the outer chart that the earlier of the two dates selected will appear in the slot in the outer chart directly over the month containing the later date selected and at a point directly over said later date, the later date being located on the calendar on the outer chart, an elapsed-days number will invariably appear at a fixed point below the calendar on the outer chart in an opening in the outer chart, called herein elapsed-time opening, provided at that point, which will be the number of days that will elapse between the two dates selected.

2. In an elapse time computer and century calendar machine, the combination of an outer chart and an inner chart, with an arrangement on the outer chart of a calendar of the months and the dates of the months in regular order, in twelve horizontal, parallel rows with slots between the rows, and with an arrangement of the days of the week in regular order, occurring and reoccurring, in twelve, horizontal, parallel rows, on the inner chart, and with an arrangement of all the years in the twentieth century in the embraces of brackets on the inner chart, with the arrangement on the inner chart herein set forth in such relation and position of its parts to each other, and in such relation and position to the calendar on the outer chart and to two indicating arrows on the outer chart, one for common years and one for leap years, so that when the point of the indicating arrow is placed to the point of the bracket embracing the year for which the calendar is sought, which is done by sliding or sliding and revolving the inner chart to such position, the calendar for the year sought will invariably be formed by the names of the days of the weeks on the inner chart appearing in the slots on the outer chart directly over the dates on the outer chart, the two charts combined forming the calendar.

In testimony whereof we affix our signatures in presence of two witnesses.

ALLEN VAN RENSSELAER.
FRED H. TENNEY.

Witnesses:
G. G. RIPLEY,
W. R. SAMPSON.